Dec. 15, 1931.  A. C. WALWORTH  1,836,097
METHOD OF AND APPARATUS FOR FREEZING FISH
Filed April 16, 1929  3 Sheets-Sheet 1

Inventor:
Austin C. Walworth,
By Macleod, Calver, Copeland & Dike.
Attorneys.

Dec. 15, 1931.  A. C. WALWORTH  1,836,097
METHOD OF AND APPARATUS FOR FREEZING FISH
Filed April 16, 1929   3 Sheets-Sheet 2
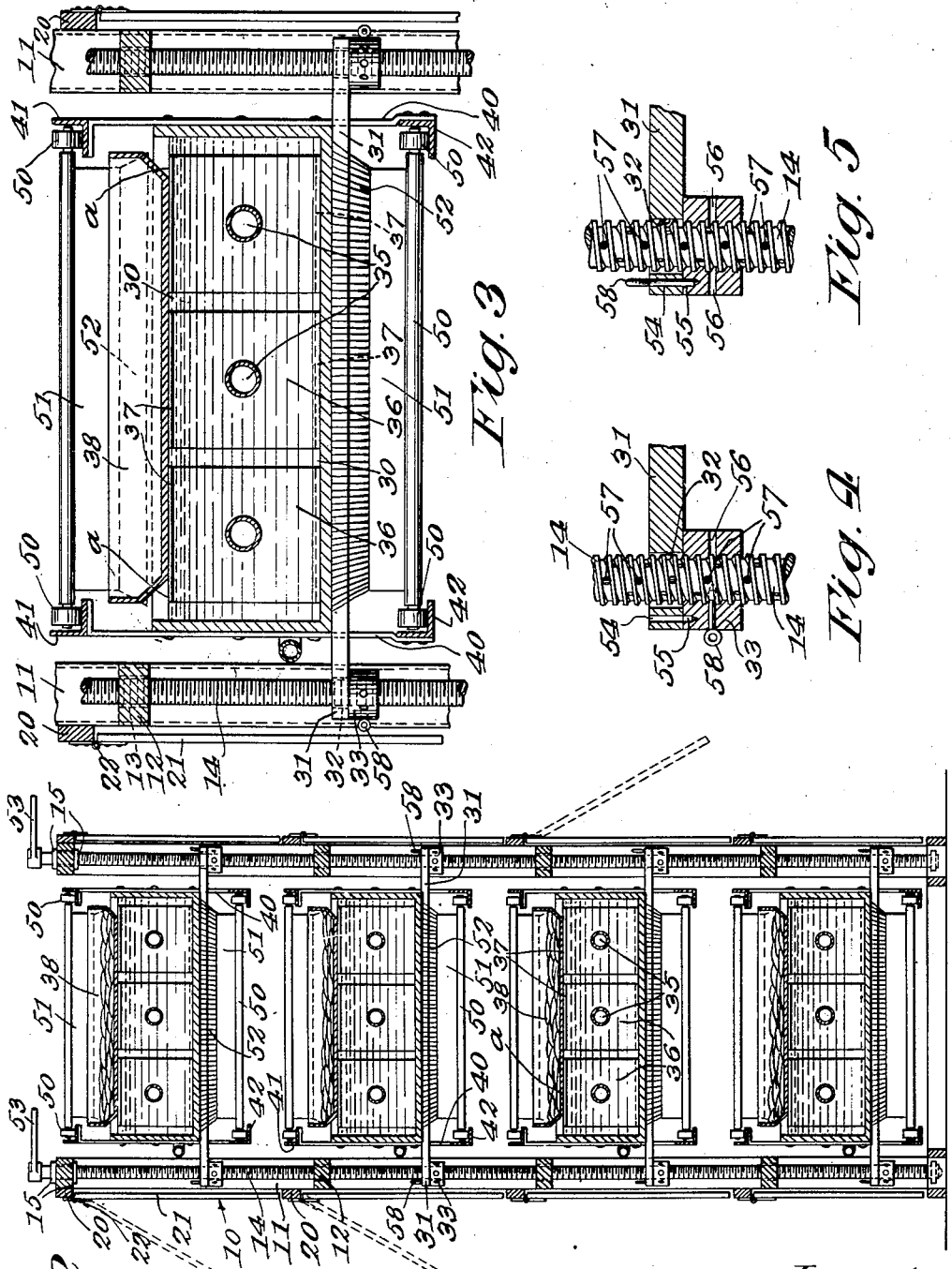

Dec. 15, 1931.   A. C. WALWORTH   1,836,097
METHOD OF AND APPARATUS FOR FREEZING FISH
Filed April 16, 1929   3 Sheets-Sheet 3
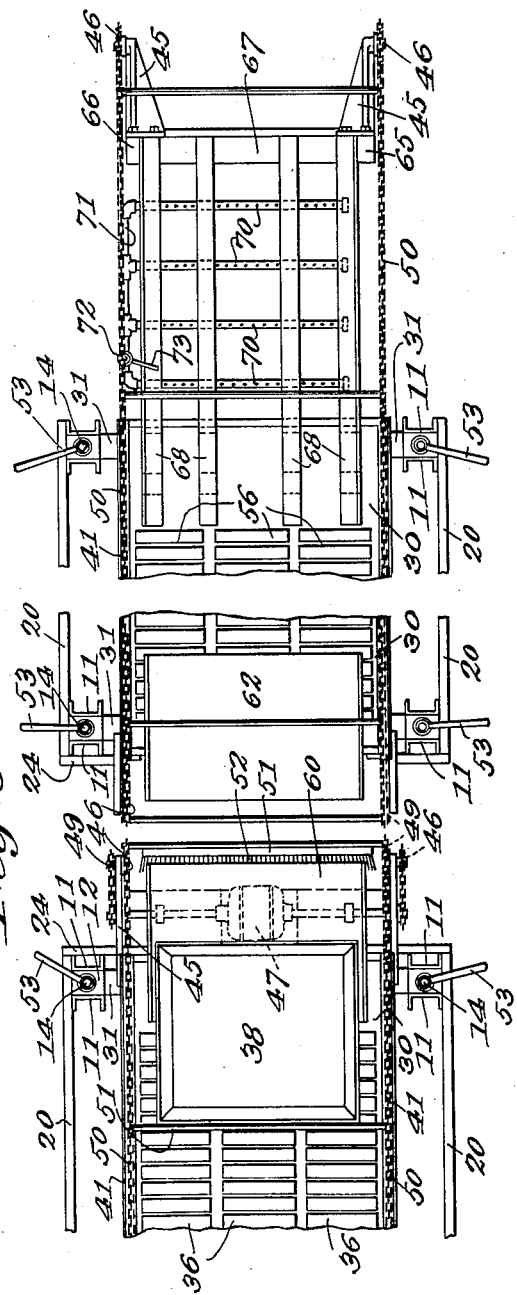
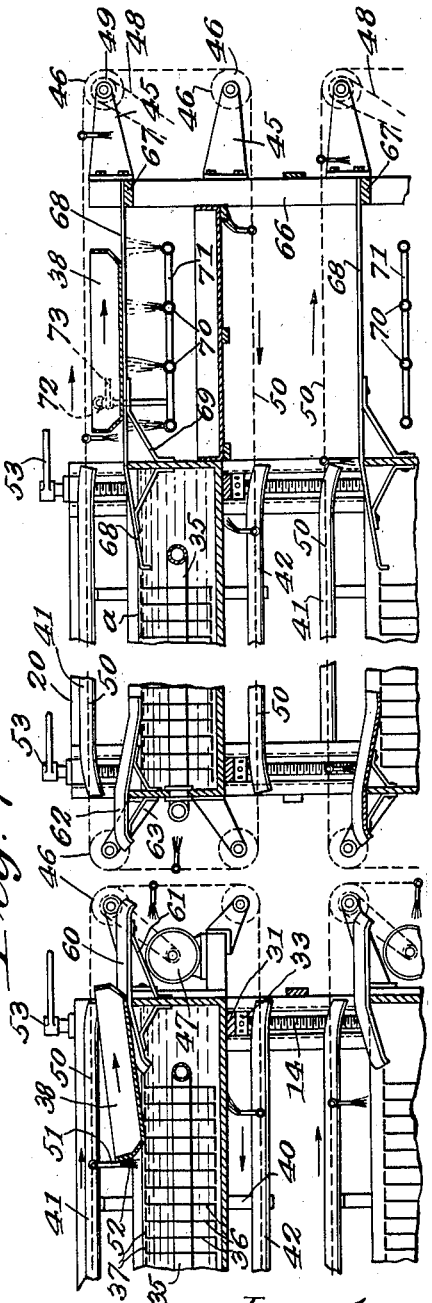

Patented Dec. 15, 1931

1,836,097

UNITED STATES PATENT OFFICE

ARTHUR C. WALWORTH, OF NEWTON, MASSACHUSETTS

METHOD OF AND APPARATUS FOR FREEZING FISH

Application filed April 16, 1929. Serial No. 355,648.

This invention relates to the preservation of perishable goods by freezing and particularly to the freezing of fish and similar foodstuffs.

It is common practice to place fish in ice to preserve the same for short periods of time. In cases where it has been desired to preserve the fish for longer periods of time, it has been common to place the fish in containers setting in a cold brine or the like, the brine being cooled by a refrigerant conduit passing through the same. The freezing of fish in this manner often has resulted in injury to the cellular structure or tissues of the fish rendering it objectionable for certain uses.

The present invention is based upon the discovery that fish may be preserved by freezing without substantial injury to the cellular structure if the fish is subjected to cooling under conditions resulting in rapidly freezing the fish. When fish are placed in a container setting in a cool brine, freezing takes place slowly because the heat is transferred between the fish and refrigerant conduit by convection. In accordance with the invention a rapid freezing of the fish is brought about by placing the fish in direct heat conducting relation with the refrigerant in the conduit. It is the primary object of the invention to provide a practical and efficient method and apparatus whereby this can be effectively accomplished.

It is a further object of the invention to provide means whereby the fish may be readily removed from the receptacle in which freezing takes place.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings, in which, Fig. 1 is an elevational view, partly in section, of an apparatus embodying the invention;

Fig. 2 is a sectional view taken upon the line 2—2 of Fig. 1;

Fig. 3 is a sectional detail view of one freezing unit;

Figs. 4 and 5 are sectional detail views showing the relation between the screws and nuts thereon and the cross members for supporting the troughs;

Fig. 6 is a plan view of the end portion of a freezing apparatus embodying the invention; and Fig. 7 is a fragmentary elevational view of the same.

Figure 1:
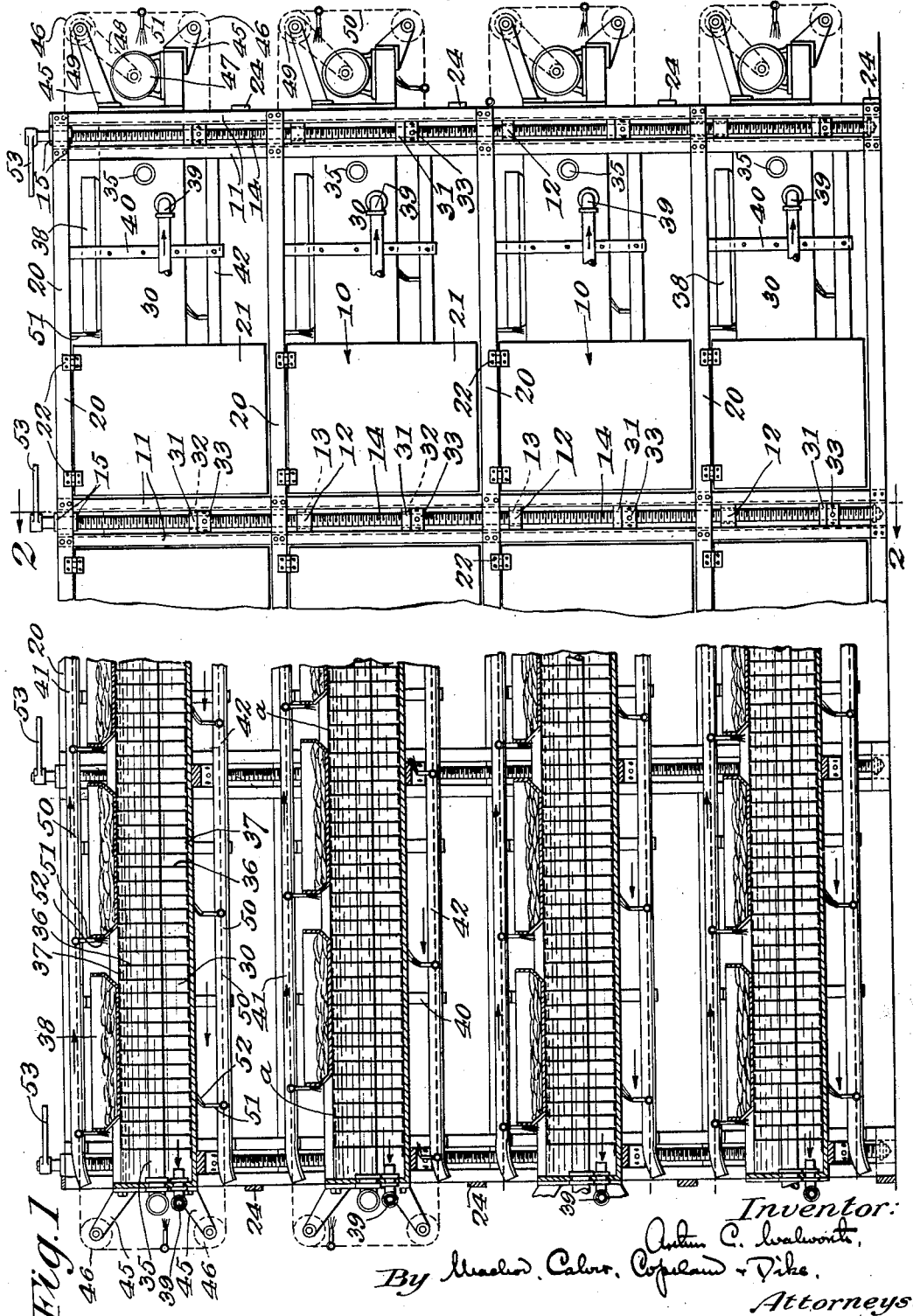

In the accompanying drawings a plurality of sets of freezing units is illustrated each comprising a frame having side members 10 and including a series of pairs of spaced channels 11. The channel members 11 of each pair are spaced apart and connected by blocks 12 each having an unthreaded opening 13 to receive a screw 14 positioned therebetween. Longitudinal movement of the screws 14 is prevented by flanges 15 thereon engaging one or more of the blocks 12. The series of pairs of channels 11 are connected by spaced longitudinal frame members 20, the space therebetween being closed by doors 21 mounted on hinges 22 secured to the longitudinal members 20. The side members 10 of the frame may be connected at their ends by cross members 24.

A plurality of superposed freezing units are movably mounted within the frame. For this purpose a plurality of nuts 33 are positioned similarly in spaced relation on oppositely disposed screws 14. Cross members 31 extend between and rest upon similarly positioned nuts 33 and are provided at opposite ends with openings 32 to receive the screws 14, the arrangement being such as to provide a plurality of cross members 31 spaced apart in each of a plurality of spaced planes. A trough 30 rests upon the cross members 31 in each plane. One or more (herein three) heat exchange elements of the extended surface type extend longitudinally through each of the troughs 30 each of said elements comprising a metal tube or conduit provided with a plurality of spaced metal fins 36 having their outer ends provided with flanges 37 located in a common plane and forming a substantially continuous heat conducting surface connected in a heat conducting relation with the refrigerant conduits 35. The flanges 37 at the bottom of the fins 36, preferably, engage the bottom of the troughs 30. A plurality of receptacles 38 composed of metal or equivalent heat conducting material are provided for receiving the fish or similar foodstuffs to be frozen and are adapted to rest upon the surface formed by the flanges 37. A pipe line 39 is connected at its opposite ends to opposite ends of each of troughs 30 and includes a pump (not shown) for circulating brine through the troughs as shown by the arrows in Fig. 1 in a direction opposite to the travel of the receptacles 38 therein.

Arms 40 are secured to the sides of each trough 30 in longitudinally spaced relation and support longitudinally extending tracks 41 spaced above the top of the trough and also support tracks 42 spaced from the bottom of the trough. Spaced brackets 45 are secured to near each corner of the ends of each trough 30 and are provided at their free ends with sprockets 46. A continuous conveyor 50 is guided above and below the trough by the tracks 41 and 42 respectively and is guided around the ends of the troughs by sprockets 46. A motor 47 is mounted upon a bracket at one end of each trough 30 and is connected by a belt 48 with a driving sprocket 49 connected with one of the sprockets 46. The conveyor 50 is provided with a plurality of plates 51 adapted to engage a receptacle 38 and move the same along the heat conducting surface formed by the flanges 37. If desired the plates 51 of each conveyor may be provided at their ends with brushes 52 adapted to engage the bottom of the trough to maintain the bottom free from ice or snow accumulations. Thus, by positioning the adjacent troughs 30 together as closely as possible the cooling medium of each assists the cooling action of the other.

In order to raise or lower one or more of the freezing units with respect to the others the screws 14 are provided with a mechanism for turning the same, such as a crank 53 on the end of each screw. The ends of the cross members 31 are provided with openings 54 adapted to cooperate with depressions 55 in nuts 33 (see Figs. 4 and 5). The nuts 33 are also provided with openings 56 adapted to cooperate with depressions 57 in the screw 14. A pin 58 is adapted to be inserted in the opening 54 to engage one of the depressions 55 to lock the cross member 31 to the nut 33 or to be inserted in the openings 56 to engage one of the depressions 57 to lock the nuts 33 to the screws 14.

In the operation of the apparatus a cooling fluid, such as a brine, is passed into each trough 30 to a level slightly above the flanges 37 as shown at $a$ in Figs. 1, 2 and 3, and, preferably, is circulated through each trough 30 in a direction opposite to the travel of the receptacles upon the flanges 37. Thus, the brine encloses the points of contact between the receptacles 38 and flanges 37. A suitable refrigerant, such as a liquefied gas, is expanded in the conduits 35. The motor 47 is actuated to move the conveyor 50 and fish is placed in receptacles 38 which are placed successively upon the heat conducting surface formed by the flanges 37 in a position at the extreme left as shown in Fig. 1 and successively engaged by the plates 51 and moved towards the right. The arrangement is such that the fish are frozen by the time the receptacles reach the extreme right hand position as shown in Fig. 1 and the receptacles are then removed. If it is desired to raise or lower one of the units with respect to its adjacent unit the pins 58 are inserted in the openings 54 so as to engage the cooperating depressions 55 in the nuts 33 supporting one of the units and the pins 58 are inserted in the openings 56 in the nuts 33 supporting the adjacent unit so as to engage the cooperating depressions 57 in the screws. The screws 14 are then turned by means of the cranks 53 whereupon the nuts 33 supporting the first unit will be moved relative to the screw and raise or lower the first unit while the nuts 33 supporting the adjacent units will merely turn with the screw and will not move relative thereto so that the units supported thereby will remain in their initial position.

In practice the length of each set of superposed freezing units often is limited by the size of the building or freezing room and it is necessary to provide a plurality of sets of freezing units through which the fish are passed successively in order that they may be subjected to the desired freezing conditions the required length of time. These units are shown end to end in Figs. 6 and 7, to simplify the illustration, but it will be understood that where the size of the freezing room limits the length of the freezing units, the units are placed in parallel relation and the fish containing receptacles are transferred from one unit and passed through the adjacent unit in an opposite direction. Each unit of the last set is provided with means for facilitating the removal of the frozen fish from the receptacles. Thus, as illustrated diagrammatically in Figs. 6 and 7 a platform 60 may be supported upon the rear end of each trough 30 of all sets except the last as by brackets 61 and a platform 62 may be supported upon the front end of each trough as by brackets 63. It will be understood that each freezing unit extends substantially the length of the freezing room and that the receptacles 38 may be transferred either manually or by suitable conveyors from one unit to the adjacent units and passed through adjacent units in opposite directions.

At the rear end of the final set of freezing units means are provided for facilitating the removal of the fish from the receptacles, but it will be understood that similar expedients may be employed where a single set of freezing units are used. As shown in Figs. 6 and 7 a supplemental frame is provided adjacent the rear end of the final set of units and comprises spaced uprights 65 and 66 connected by cross members 67. Spaced longitudinal strips 68 are supported at one end upon one of the cross members 67 with the other end inclined downwardly into one of the troughs 30 and supported by brackets 69 thereon. The strips 68 serve as supports or platforms upon which the receptacles 38 are moved by the conveyors. A spray device is arranged below each of these groups of strips and comprises a plurality of perforated pipes 70 connected with a water main 71 in which is arranged a self-closing valve 72 having an operating lever 73 extending into the path of movement of the receptacles 38.

As each receptacle 38 is moved along the strips 68 it engages the lever 73 to open the valve 72 to cause a spray of water to be directed upon the bottom of the receptacle and warm the same sufficiently to loosen fish frozen thereto. When the receptacle has passed the lever 73 the valve 72 automatically closes and stops the spray. In this manner the spray is directed upon the receptacle a predetermined length of time sufficient to loosen the fish but insufficient to warm the fish to a detrimental extent.

It will be noted that in the apparatus of the invention the fish are frozen in a rapid manner inasmuch as the receptacles holding the same are not only in direct contact with the cool brine but are also at all times in direct metal-to-metal contact with the flanges 37 of the fins 36, and therefore in a direct heat conducting relation, by an all-metal path or connection, with the refrigerant in the conduits 35, thereby removing the heat from the fish in a rapid manner. Furthermore, inasmuch as the level of the brine is above the surface upon which the receptacles rest, the brine exerts a buoyant action upon the receptacles and reduces the friction which must be overcome in moving the receptacles. This arrangement reduces the power required to move the receptacles.

I claim:

1. In an apparatus for freezing fish and similar foodstuffs, a freezing unit comprising a trough containing a cooling fluid, a heat exchange element in said trough having a heat conducting surface, a heat conducting receptacle movable on and in direct contact with said surface, and means for moving said receptacle on said surface.

2. In an apparatus for freezing fish and similar foodstuffs, a freezing unit comprising a refrigerant conduit, heat conducting fins spaced apart on said conduit and having their outer ends located to form a substantially continuous plane surface, a heat conducting receptacle adapted to be supported on said surface, and means for moving said receptacle along said surface.

3. In an apparatus for freezing fish and similar foodstuffs, the combination of a frame, a freezing unit supported in said frame comprising a trough containing a cooling fluid, a heat exchange element in said trough having a heat conducting surface and submerged in said fluid, a heat conducting receptacle movable on said surface, and means for moving said receptacle.

4. In an apparatus for freezing fish and similar foodstuffs, a freezing unit comprising a trough adapted to contain a cooling liquid, a refrigerant conduit in said trough, heat conducting fins spaced apart on said conduit and having their outer ends located to form a substantially continuous plane surface, a heat conducting receptacle adapted to be supported on said surface, and means for moving said receptacle along said surface.

5. In an apparatus for freezing fish and similar foodstuffs, the combination of a frame, a freezing unit supported in said frame comprising a trough, a refrigerant conduit in said trough, means within said trough for supporting fish in direct heat conducting relation to said conduit, and means for adjusting the position of said trough in said frame.

6. In an apparatus of the character described, the combination of a frame, a freezing unit supported in raised position in said frame comprising a trough, a heat exchange element in said trough having a heat conducting surface within said trough connected in heat conducting relation with said conduit, a heat conducting receptacle movable on said surface, a conveyor supported by said trough and movable above the top and below bottom thereof, and means on said conveyor adapted to engage said receptacle to move the same along said surface.

7. In an apparatus of the character described, the combination of a frame, a freezing unit supported in raised position in said frame comprising a trough, a heat exchange element in said trough having a heat conducting surface, a heat conducting receptacle movable on said surface, a conveyor supported on said trough and movable above the top and below bottom thereof, and a member on said conveyor arranged to engage the bottom of said trough in its movement therebelow and engage said receptacle to move the same along said surface.

8. In an apparatus of the character described, the combination of a frame including spaced screws, a nut similarly positioned on each screw, a cross member extending between and surrounding said screws and having its opposite ends resting on said nuts, a trough supported by said cross member, a refrigerant conduit in said trough, and means for supporting fish in direct heat conducting relation to said conduit.

9. In an apparatus of the character described, the combination of a frame including spaced screws, a plurality of nuts similarly positioned in spaced relation on each of said screws, cross members extending between and surrounding said screws and having their opposite ends resting on similarly positioned nuts, means for locking a pair of said nuts supporting one cross member, and means for locking another pair of cross members supporting nuts to said screws.

10. In an apparatus of the character described, the combination of a frame, a freezing unit supported in said frame, a spray device supported within the frame, and means for moving a fish containing receptacle in a path through said freezing unit and above said spray device, said spray device being arranged to direct a spray of relatively warm fluid upon the bottom of said receptacle.

11. In an apparatus of the character described, the combination of a frame, a freezing unit supported in said frame, a spray device supported within the frame, means for moving a fish containing receptacle in a path through said freezing unit and above said spray device, said spray device being arranged to direct a spray of relatively warm fluid upon the bottom of said receptacle, and means for controlling the length of time said spray is directed upon said receptacle.

12. In an apparatus of the character described, the combination of a frame, a freezing unit supported in said frame, a spray device supported within the frame, means for moving a fish containing receptacle in a path through said freezing unit and above said spray device, said spray device being arranged to direct a spray of relatively warm fluid upon the bottom of said receptacle, a self-closing valve for controlling the operation of said spray, and a control lever connected to said valve and extending into the path of movement of said receptacle.

13. The hereindescribed method of freezing fish and similar foodstuffs which includes placing the same in a metal receptacle and moving said receptacle over and in direct contact with a heat exchange element containing a suitable refrigerant and submerged in a cooling liquid.

14. The hereindescribed method of freezing fish and similar foodstuffs which includes placing the same in a metal receptacle and moving said receptacle over and in direct contact with a heat exchange element containing a suitable refrigerant and submerged in a cooling liquid, and circulating said liquid in the opposite direction to the travel of said receptacle.

15. In an apparatus for freezing fish and similar foodstuffs, the combination of a frame, a freezing unit supported in said frame comprising a trough containing a cooling fluid, a heat exchange element in said trough having a heat conducting surface submerged in said fluid, a heat conducting receptacle movable on said surface, means for moving said receptacle, and means for circulating said fluid in a direction opposite to the direction of movement of the receptacle.

16. In an apparatus for freezing fish and similar foodstuffs, in combination, a trough, a heat exchange element extending longitudinally of said trough and having a substantially horizontal heat conducting surface, a heat conducting receptacle supported on said surface in direct contact therewith and movable thereover, and a cooling liquid filling said trough to a depth sufficient to cover said surface but insufficient to float said receptacle out of contact therewith.

17. The method of freezing fish and similar foodstuffs which comprises placing the fish in a heat conducting receptacle, moving said receptacle while in substantially uninterrupted heat conducting contact with a refrigerant conduit, and submerging said conduit in a cooling liquid in amount insufficient to float said receptacle out of contact with the conduit.

18. The method of freezing fish and similar foodstuffs which comprises placing the fish in a heat conducting receptacle, moving said receptacle while in substantially uninterrupted heat conducting contact with a refrigerant conduit, and circulating over said conduit and in contact with said receptacle a cooling liquid in amount insufficient to float said receptacle out of contact with said conduit.

19. The method of freezing fish and similar foodstuffs which comprises placing the same in a metal receptacle and moving said receptacle over and in direct metal to metal contact with a metallic heat exchange element containing a suitable refrigerant.

20. In an apparatus for freezing fish and similar foodstuffs, a freezing unit comprising a metallic heat exchange element having a metallic surface, a metal receptacle adapted to contain fish movable on and in direct contact with said surface, and means for moving said receptacle on said surface, whereby direct metal to metal contact is maintained substantially uninterruptedly between said heat exchange element and the fish in said receptacle.

In testimony whereof I affix my signature.

ARTHUR C. WALWORTH.